United States Patent
Wright

(10) Patent No.: US 9,441,121 B2
(45) Date of Patent: Sep. 13, 2016

(54) DISPERSIONS, PROCESS FOR PREPARING DISPERSIONS, INKS AND USES

(71) Applicant: Fujifilm Imaging Colorants Limited, Manchester (GB)

(72) Inventor: Gavin Wright, Manchester (GB)

(73) Assignee: Fujifilm Imaging Colorants Limited (GB)

( * ) Notice: Subject to any disclaimer, the term of this patent is extended or adjusted under 35 U.S.C. 154(b) by 169 days.

(21) Appl. No.: 14/349,447

(22) PCT Filed: Sep. 25, 2012

(86) PCT No.: PCT/GB2012/052361
§ 371 (c)(1),
(2) Date: Apr. 3, 2014

(87) PCT Pub. No.: WO2013/050737
PCT Pub. Date: Apr. 11, 2013

(65) Prior Publication Data
US 2014/0275411 A1    Sep. 18, 2014

(30) Foreign Application Priority Data
Oct. 5, 2011  (GB) .................................. 1117093.3

(51) Int. Cl.

| | | |
|---|---|---|
| *C08G 18/08* | (2006.01) | |
| *C08G 18/38* | (2006.01) | |
| *C08G 18/75* | (2006.01) | |
| *C08G 18/76* | (2006.01) | |
| *C09D 11/30* | (2014.01) | |
| *C09D 11/326* | (2014.01) | |
| *C09D 11/102* | (2014.01) | |
| *C09D 175/04* | (2006.01) | |

(52) U.S. Cl.
CPC .......... *C09D 11/102* (2013.01); *C08G 18/0819* (2013.01); *C08G 18/388* (2013.01); *C08G 18/3891* (2013.01); *C08G 18/755* (2013.01); *C08G 18/7671* (2013.01); *C09D 11/30* (2013.01); *C09D 11/326* (2013.01); *C09D 175/04* (2013.01)

(58) Field of Classification Search
CPC ............ C08G 18/0819; C08G 18/388; C08G 18/3891; C08G 18/755; C08G 18/7671; C09D 11/102; C09D 11/326; C09D 11/30; C09D 175/04
See application file for complete search history.

(56) References Cited

U.S. PATENT DOCUMENTS

| | | | |
|---|---|---|---|
| 3,076,010 A | | 1/1963 | Back et al. |
| 3,314,957 A | * | 4/1967 | Friedman .............. C07F 9/4006 250/396 R |
| 4,052,487 A | | 10/1977 | Sturtz et al. |
| 4,889,895 A | | 12/1989 | Chernega et al. |
| 5,254,432 A | | 10/1993 | Aoai |
| 5,491,029 A | | 2/1996 | Evans et al. |
| 5,969,002 A | | 10/1999 | Kijlstra et al. |
| 6,034,154 A | | 3/2000 | Kase et al. |
| 6,136,890 A | | 10/2000 | Carlson et al. |
| 6,680,355 B1 | * | 1/2004 | Weingart ............ B01F 17/0042 106/31.01 |
| 2004/0085419 A1 | | 5/2004 | Yau et al. |
| 2004/0260013 A1 | | 12/2004 | Richards |
| 2008/0145744 A1 | | 6/2008 | Kim et al. |

FOREIGN PATENT DOCUMENTS

| | | |
|---|---|---|
| CN | 102070762 A | 5/2011 |
| GB | 2318581 A | 4/1998 |
| WO | 99/41320 A1 | 8/1999 |
| WO | 03/046038 A1 | 6/2003 |
| WO | 2013/005019 A2 | 1/2013 |
| WO | 2013/005021 A1 | 1/2013 |

OTHER PUBLICATIONS

International Preliminary Report on Patentability dated Apr. 17, 2014, issued from corresponding PCT/GB2012/052361.

* cited by examiner

*Primary Examiner* — Patrick Niland
(74) *Attorney, Agent, or Firm* — Banner & Witcoff, Ltd.

(57) ABSTRACT

A process for the preparation of a dispersion, comprising: dispersing a composition comprising a particulate solid, a liquid medium and a dispersant; wherein the dispersant is obtained by a process comprising at least the steps a) and b): a) co-polymerising a monomer composition comprising at least the components i) and ii) so as to form a phospho-ester functional polymer: i) a monomer having at least one phospho-ester group and two groups independently selected from hydroxyl, amino, thiol and hydrazo groups, ii) a diisocyanate; and b) hydrolysing at least some of the phospho-ester groups in the phospho-ester functional polymer so as to result in a dispersant having phosphorus containing anionic groups.

20 Claims, No Drawings

DISPERSIONS, PROCESS FOR PREPARING DISPERSIONS, INKS AND USES

RELATED APPLICATION DATA

This application is a National Stage Application under 35 U.S.C. 371 of co-pending PCT application PCT/GB2012/052361 designating the United States and filed Sep. 25, 2012; which claims the benefit of GB application number 1117093.3 and filed Oct. 5, 2011 each of which are hereby incorporated by reference in their entireties.

TECHNICAL FIELD

This invention relates to a process for preparing a dispersion (especially a pigment dispersion) using certain dispersants, it further relates to the dispersions themselves. It relates to inks comprising said dispersions and especially to ink jet printing inks. It also relates to the use of said dispersants for preparing ink jet printing inks.

BACKGROUND

Inks are often of one of two types, depending on the type of colorant used. Dye-based inks often comprise a dye dissolved in a liquid medium. Pigment inks often comprise a pigment dispersed in a particulate form in a liquid vehicle. Pigment inks tend to have better ozone-fastness and light-fastness than dye-based inks. However, because the pigment is in the form of fine particles there is a tendency for the particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been spent attempting to provide pigment dispersions with sub micron sized particles and to increase the colloidal stability of these pigment dispersions. It is desirable that the ink is capable of printing for long periods and to a high print quality, this is often referred to as operability.

It is also desirable to provide pigment inks which offer high optical density (OD), especially when printed onto plain paper.

Pigment dispersions are often colloidally stabilised by means of a dispersant.

In our own studies on dispersant stabilised pigment inks we have found that it is particularly difficult to prepare inks which simultaneously exhibit good colloidal stability and high OD on plain paper. For example, we have found that dispersant stabilised pigment inks known in the art having a high colloidal stability provide a low OD when printed on to plain paper and vice versa.

We have also found that the few dispersant stabilised pigment inks which do provide inks exhibiting high OD when printed onto plain paper tend to also use dispersants which require significant and undesirably high amounts of organic liquids to assist in dissolving/dispersing the dispersant, for example in the pigment dispersion or comminution step.

Further, it is desirable that a dispersant is effective in the dispersion or comminution process. Quicker comminution (e.g. milling) to submicron particles sizes saves substantial energy and it may also result in less pigment particles having a particles size markedly smaller than the target size. Particles much below the target size are often referred to as fines.

Pigment based inks when printed onto a substrate often produce final images wherein the pigment is not firmly secured to the substrate surface. Prints from pigment based inks often exhibit poor rub fastness, water-fastness or high-lighter smear fastness.

Aqueous inks and ink jet printing inks require very different polymers as dispersant from organic inks. The present invention also aims to provide polymers suitable as dispersants for particulate solids in aqueous liquid vehicles. In addition the present invention attempts to provide polymers which can colloidally stabilise dispersions of particulate solids even when large amounts of organic liquid are present in combination with water.

Commercially, there still remains a need for dispersions which can be used to prepare pigment inks which solve, at least in part, one or more of the abovementioned problems.

PRIOR ART

PCT patent publication WO99/41320 discloses polyurethane dispersants for preparing pigment-based ink jet printing inks. WO99/41320 does mention the possibility that the polyurethane dispersant can have phosphoric or phosphonic acid groups. An example of this is disclosed at page 26, preparation 9. The phosphonic or phosphoric acid groups are introduced by copolymerising a monomer having that acid group.

PCT patent publication WO2003/046038 also discloses polyurethane dispersants for preparing pigment-based ink jet printing inks. Phosphonic acid groups can be introduced into the polyurethane dispersant by the use of diols containing a phosphonic acid group (e.g. a product named ITC 1081 sold by Albright and Wilson—page 8, lines 19 to 26).

The inventors detailed studies showed that preparing for example polyurethanes having phosphorus containing anionic groups proved somewhat unsatisfactory using approaches analogous with those of the above mentioned prior art documents. The present inventors found that polyurethane dispersants prepared by the known method: i) were difficult to filter and purify; ii) were less effective as dispersants; and/or iii) they found that the final dispersions and ink jet printing inks provided only moderate stability, operability, print quality, optical density and reliability. The present inventors observed that there was a distinct tendency for the known copolymerisation route to result in polyurethane polymers which were substantially branched and/or which contained significant amounts of gel material (insoluble cross-linked material). The branched and/or gelled material was postulated to be the cause of the above problems. It was found that the more phosphorus containing anionic groups which were incorporated into the polyurethane dispersant the worse became the problems associated with branched and gel materials.

Accordingly, the present inventors sought to prepare dispersions of particulate solids with dispersants which addressed the above mentioned technical problems.

DETAILED DESCRIPTION

According to a first aspect of the present invention there is provided a a process for the preparation of a dispersion, comprising:
dispersing a composition comprising a particulate solid, a liquid medium and a dispersant;

wherein the dispersant is obtained by a process comprising at least the steps a) and b):

a) co-polymerising a monomer composition comprising at least the components i) and ii) so as to form a phospho-ester functional polymer:
   i) a monomer having at least one phospho-ester group and two groups independently selected from hydroxyl, amino, thiol and hydrazo groups.
   ii) a diisocyanate; and
b) hydrolysing at least some of the phospho-ester groups in the phospho-ester functional polymer so as to result in a dispersant having phosphorus containing anionic groups.

DEFINITIONS

Unless stated to the contrary, in the present invention the words "a" and "an" are meant to include the possibility of using one or more of that item. Thus, a diisocyanate means one or more diisocyanates. Similarly, a monomer means one or more monomers.

Particulate Solid

The particulate solid may be of any kind. Preferably the particulate solid is a colorant, more preferably a pigment. The pigment may comprise and preferably is an inorganic or organic pigment material or mixture thereof which is insoluble in the liquid medium. By insoluble we mean having a solubility of no more than 1%, more preferably no more than 0.1% by weight in the liquid medium. The solubility is preferably measured at a temperature of 25° C. The solubility is preferably measured at a pH of 7. Preferably, the solubility is measured in water, more preferably deionized water.

The pigment may be organic or inorganic.

A preferred pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrones, anthanthrones, and quinacridones.

Preferred inorganic pigments include carbon black (especially gas blacks), titanium dioxide, silicon dioxide, aluminium oxide, iron oxides and sulfides.

For ink jet especially suitable pigments are carbon blacks, C.I. Pigment Red 122, C.I. Pigment Blue 15:3 and C.I. Pigment Yellow 74. Of course there are many alternative pigments.

The pigment is preferably not surface treated so as to covalently bind water-dispersing groups onto its surface. Preferably, the pigment is not dispersible in water without the aid of a dispersant.

Liquid Medium

As used herein the words "liquid medium" refer to the liquid components present whilst the particulate solid and the dispersant are being dispersed. The word liquid as used herein preferably means a substance that is liquid at a temperature of 25° C. In some embodiments the liquid medium (and the liquid vehicle) may be curable by UV or electron beam energy but it is preferred that the liquid medium (and the liquid vehicle) cannot be so cured.

The liquid medium may be wholly organic but preferably is or comprises water (i.e is aqueous).

In some cases, the liquid medium comprises water and optionally one or more organic liquids, especially water-miscible organic liquids. In some instances it is preferred that the liquid medium comprises water and less than 50% by weight, more preferably less than 30% by weight, especially less than 20% by weight, more especially less than 10% and most especially less than 1% by weight of water-miscible organic liquids relative to the total amount of liquids present in the dispersion. In some cases the liquid medium for the dispersion comprises water and no organic liquid. These dispersions facilitate more formulation options especially for ink jet printing inks. The dispersants used in the present invention are especially suited to dispersing particulate solids in liquid media which contain water and only small amounts of water-miscible organic liquids or in entirely aqueous liquid media (water is the only liquid present in the liquid medium).

Preferred water-miscible organic liquids for inclusion into the liquid medium include:
i) $C_{1-6}$-alkanols, preferably methanol, ethanol, n-propanol, isopropanol, n-butanol, sec-butanol, tert-butanol, n-pentanol, cyclopentanol and cyclohexanol;
ii) linear amides, preferably dimethylformamide or dimethylacetamide;
iii) water-miscible ethers, preferably tetrahydrofuran and dioxane;
iv) diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, dipropylene glycol, triethylene glycol, polyethylene glycol and polypropylene glycol;
v) triols, preferably glycerol and 1,2,6-hexanetriol;
vi) mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether;
vii) cyclic amides, preferably 2-pyrrolidone, N-methyl-2-pyrrolidone, N-ethyl-2-pyrrolidone, caprolactam and 1,3-dimethylimidazolidone.

Preferably, the liquid medium comprises water and optionally 1 or more, especially optionally from 1 to 3, water-miscible organic liquids. An especially preferred water-miscible organic liquid in the liquid medium is dipropylene glycol.

Dispersant

Preferably, the dispersant has a weight averaged molecular weight of from 1,000 to 500,000, more preferably from 5,000 to 200,000, especially from 10,000 to 100,000 and more especially from 10,000 to 50,000.

The molecular weight is preferably measured by gel permeation chromatography (GPC). The molecular weight standards employed are preferably polyethylene glycol or more preferably polystyrene. The solvent used for GPC is preferably dimethyl formamide, tetrahydrofuran or acetone. A preferred method uses polystyrene as the standard and dimethyl formamide as the solvent.

Preferably, the dispersant is linear. For such dispersants it is preferred that no monomer is included which has 3 or more groups which are reactive in the polymerisation reaction (e.g. triisocyanates or triols).

Preferably, the dispersant has a gel fraction of less than 2%, more preferably less than 1% and especially less than 0.5% by weight. More preferably the dispersant has no measurable gel fraction. A preferred method for determining the gel fraction is by soxhlet extraction. Preferably the extraction solvent is dimethyl formamide. The extraction with dimethyl formamide is preferably carried out for at least 8 hours. The percentage of gel is preferably measured gravimetrically.

The dispersant has phosphorus containing anionic groups. Preferably, the phosphorus atom is covalently bonded to the dispersant structure via an oxygen or carbon atom, more preferably via a carbon atom. The phosphorus containing anionic group may be a phosphoric acid group but is more preferably a phosphonic acid group. In the present studies the phoshonic acid groups have been found to be more stable in aqueous liquid media towards hydrolysis.

The amount of phosphorus containing anionic groups in the dispersant is preferably from 0.05 to 10 mmoles/g, more preferably from 0.05 to 5 mmoles/g, even more preferably from 0.25 to 4 mmoles/g, especially from 0.25 to 3 mmoles/g and most especially from 0.25 to 1.5 mmoles/g. In some cases the amount of phosphorus containing anionic groups in the dispersant is preferably from 0.5 to 8 mmoles/g.

In order of increasing preference the amount of phosphorus containing anionic groups in the dispersant is preferably at least 0.05 mmoles/g, 0.1 mmoles/g, 0.25 mmoles/g and 0.5 mmoles/g.

In order of increasing preference the amount of phosphorus containing anionic groups in the dispersant is preferably no more than 10 mmoles/g, 8 mmoles/g, 5 mmoles/g, 4 mmoles/g, 3 mmoles/g, 2 mmoles/g and 1.5 mmoles/g.

Where the dispersant only has acidic groups which are selected from phosphonic acid and phosphoric acid groups it follows that the acid value of the dispersant is simply 2 times the molar amount of the total of phosphonic and phosphoric acid groups.

The amount of phosphorus containing anionic groups can be determined by calculations if the monomer composition is known. Alternatively, it can be determined from elemental phosphorus analysis. A preferred method is inductively coupled plasma-optical emission spectrometer (ICP-OES). A preferred ICP-OES device for determining the elemental phosphorus is a Perkin Elmer 3300DV.

In one case, the above amounts are the amounts of phosphonic acid groups in the dispersant.

Preferably, the dispersant has a phosphorus content of from 0.05 to 20 wt % more preferably from 0.5 to 20 wt %, even more preferably from 1 to 10 wt %, especially from 1 to 5 wt % and more especially from 2 to 4 wt %.

In order of increasing preference the dispersant preferably has a phosphorus content of at least 0.05 wt %, 0.1 wt %, 0.25 wt %, 0.5 wt % and 1 wt %.

In order of increasing preference the dispersant preferably has a phosphorus content of no more than 20 wt %, 10 wt %, 7 wt %, 5 wt % and 3 wt %.

Preferably, all the phosphorus present in the dispersant is in the form of groups selected from a phosphorus containing acid and phospho-ester groups. Of course some of these groups must be phosphorus containing acid groups as required in the first aspect of the present invention.

Other anionic groups may optionally be present in the dispersant. For example the dispersant may additionally have carboxylic acid and/or sulfonic acid groups. Preferably however, the dispersant has less than 1 mmole/g, more preferably less than 0.5 mmole/g and especially no other anionic groups (except the phosphorus containing anionic groups). Carboxylic acid groups can be readily quantified by titration. Sulfonic acid groups can be established by elemental analysis.

Any anionic groups present in the dispersant may be in the form of the free acid (protonated), in the form of a salt or a mixture thereof. Preferably, the anionic groups are in the form of a salt. Suitable salts include those with the alkali metal ions (especially sodium, potassium and lithium) as well as those with amines, organic amines and alkanolamines. The anionic groups need not be completely neutralised. It is preferred that the degree of neutralisation is from 30 to 150% and more preferably from 50 to 130% by moles. 100% by moles represents exactly 2 moles of monobasic base per 1 mole of phosphorus containing anionic group.

Preferably, the neutralisation is such that the pH of the dispersion is from 7 to 12, more preferably from 8 to 12.

The dispersant may be insoluble but is preferably soluble in the liquid medium. Preferably, the dispersant is soluble at a temperature of 25° C.

Preferably, the dispersant has a solubility which is at least 5%, more preferably at least 10% by weight in the liquid medium. Preferably, the solubility is determined by using deionized water as the liquid medium. Preferably, the solubility is determined using the potassium salt of dispersant at 100 mole % neutralisation of any acidic groups in the dispersant.

Preferably, the dispersant is a polyurea, polythiourea or more preferably a polyurethane.

The dispersant need not be synthesized as a mandatory part of the present invention or of its claims. Thus for example, if in the future dispersants as required in the present invention became commercially available these could simply be purchased and used to prepare the required dispersion.

Preparation of the Dispersant

Step a)

In step a) a phospho-ester functional polymer is formed. The monomers in component i) all have 2 (and only 2) isocyanate reactive groups which can be selected independently from hydroxyl (—OH), amino (including primary and secondary amino), thiol (—SH) or hydrazo (NH$_2$—NH—) groups. Preferred isocyanate reactive groups are amine, thiol, and especially hydroxyl groups. Preferred monomers for component i) are diamines, dithiols, dihydrazines and especially diols. Thus the preferred monomers in component i) are phospho-ester diols.

Each of the monomers in component i) must have at least one phospho-ester group. The phospho-ester may be a phosphoric acid ester or more preferably a phosphonic acid ester. The phospho-esters may be partial such that some anionic functionality remains, more preferably the phospho-esters are complete (fully esterified). In this way the phosphorus groups have no anionic charges or acidic protons. Of course where partial phospho esters are used which comprise some phosphorus containing anionc groups the hydrolysis step b) produces a dispersant having more phosphorus containing anionic groups. That is, more than were present prior to the hydrolysis step. The use partial phospho esters is often less preferred as the subsequent reaction with isocyanates is more prone produce branched or gelled structures. For this reason complete phospho esters are preferred.

Preferably component i) comprises a monomer of the Formula (1):

$$X^1\text{-}A\text{-}X^2 \qquad \text{Formula (1)}$$

wherein:
X$^1$ and X$^2$ are each independently selected from amine, hydrazo, thiol and hydroxyl groups;
A is an organic group substituted with one or more groups of the Formula (2):

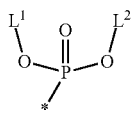

Formula (2)

wherein:
each L$^1$ and L$^2$ independently is H or an optionally substituted alkyl, aryl or heterocyclyl group, provided that L$^1$ and L$^2$ are not both H;
the asterisk (*) represents the point of attachment of the group of Formula (2) in the compound of Formula (1); and
the phosphorus atom in Formula (2) is bonded to the A group in Formula (1) via a carbon or oxygen atom in the A group.

Preferably X$^1$ and X$^2$ are hydroxyl groups (—OH).

Preferably the phosphorus atom in Formula (2) is bonded to the A group in Formula (1) via a carbon atom in the A group. In the inventor's studies such groups offered a more secure attachment to the A group thus in step b) allowing the L$^1$ and L$^2$ groups to be hydrolysed selectively without cleaving the phosphorus groups out of the dispersant structure.

The L$^1$ and L$^2$ groups are preferably each independently optionally substituted alkyl, aryl or heterocyclyl groups.

The L$^1$ and L$^2$ groups are preferably each independently optionally substituted alkyl groups. Preferred alkyl groups are optionally substituted C$_{1-20}$ alkyl, more preferably C$_{1-8}$ alkyl and especially C$_{1-4}$ alkyl groups. Preferred alkyl groups are optionally substituted methyl, ethyl, propyl and butyl groups. Of these methyl and especially ethyl groups are preferred from the perspective of efficient subsequent hydrolysis in step b). Preferred aryl groups include optionally substituted phenyl and naphthyl groups.

The optional substituents in the L$^1$ and L$^2$ groups may be selected from —NO$_2$, CN, halo (especially Cl, F, Br and I), —NHC(O)C$_{1-6}$alkyl, —SO$_2$NHC$_{1-6}$alkyl, —SO$_2$C$_{1-6}$alkyl, —OC$_{1-6}$alkyl and —OC(O)C$_{1-6}$alkyl. It is preferred that no substituent present in the L$^1$ or L$^2$ group has isocyanate reactive groups as hereinbefore mentioned. Halo substituents are also less preferred. Preferably, the groups L$^1$ and L$^2$ have no optional substituents.

L$^1$ and L$^2$ are preferably each independently selected from unsubstituted C$_{1-4}$alkyl groups (especially unsubstituted methyl and ethyl groups).

Preferably A is C$_{1-30}$ organic group optionally interrupted with one or more nitrogen, oxygen or sulfur atoms. A may be aromatic, aliphatic, heterocyclic or a combination thereof. Preferably A is aliphatic group optionally interrupted with a nitrogen atom.

Preferably component i) comprises a monomer of the Formula (3):

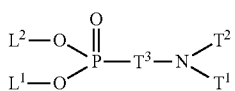

Formula (3)

wherein:
L$^1$ and L$^2$ are as previously defined and preferred;
T$^1$ and T$^2$ each independently are C$_{1-6}$ alkyl each having a single hydroxyl group; and
T$^3$ is a C$_{1-6}$ alkylene group.

Preferably T$^1$ and T$^2$ are each independently —CH$_2$CH$_2$OH or —CH$_2$CH(OH)CH$_3$, more preferably —CH$_2$CH$_2$—OH.

Preferably T$^3$ is —CH$_2$—, —(CH$_2$)$_2$—, —(CH$_2$)$_3$— or —CH$_2$—CH(CH$_3$)—, more preferably —CH$_2$—.

Preferably, all the monomer present in component i) are of the Formula (1), more preferably of the Formula (3).

An especially preferred compound of the Formula (3) is of the Formula (4):

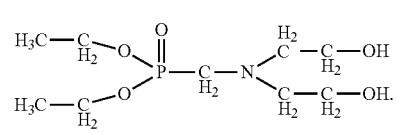

Formula (4)

The component i) may comprise a monomer of the Formula (5):

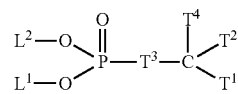

Formula (5)

wherein:
L$^1$, L$^2$, T$^1$, T$^2$ and T$^3$ are as previously defined and preferred and T$^4$ is H or a C$_{1-6}$ alkyl.

Component i) may comprise a monomer of the Formula (6):

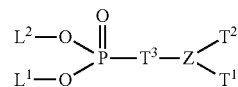

Formula (6)

wherein L$^1$, L$^2$, T$^1$, T$^2$ and T$^3$ are as previously defined and preferred and Z is an aryl group, especially a benzene or naphthylene ring.

The monomers in component i) may be commercially obtained or they may be prepared synthetically.

A preferred class of monomers for component i) is the phosphonate ester diols. Such monomers can be prepared by the well known Michaelis-Arbuzov reaction wherein a trialkyl phosphite and an alkyl halide are co-reacted. In addition diol phosphonate esters may be prepared by the methods disclosed in US patent publication U.S. Pat. No. 4,052,487 or those disclosed in US patent publication U.S. Pat. No. 3,076,010.

A preferred synthetic method which produces particularly useful diol phosphonate esters reacts 2-(1,3-oxazolidin-3-yl)ethanol (cas number 20073-50-1) with a dialkyl (especially diethyl or dimethyl) phosphite. Preferably, the synthetic method is performed using heating at a temperature of from 30 to 100, more preferably from 40 to 80 and especially around 60° C. Preferably, the heating is maintained for a period of from 30 minutes to 16 hours, more preferably from 30 minutes to 8 hours and especially from 30 minutes to 4 hours. 2-(1,3-oxazolidin-3-yl)ethanol can be obtained commercially or it can be synthesized by the reaction between paraformaldehyde and diethanolamine.

Mixtures of different monomers may be present in component i).

Preferably, component i) comprises monomers which in total are at least 1 mole %, more preferably at least 3 mole % and especially at least 5 mole % relative to the total number of moles of all the monomer components used to prepare the phospho-ester functional polymer in step a). Preferably component i) comprises monomers which in total are less than 50 mole %, more preferably less than 30 mole % and more especially less than 20 mole % relative to the total number of the moles of all the components used to prepare the phospho-ester functional polymer in step a).

Diisocyanate

The diisocyanate may be of any kind without any particular limitations. The diisocyanate may be aliphatic, aromatic or a mixture of both. Preferably, the diisocyanate has no ionic, amino, hydrazo ($NH_2NH-$), thiol or hydroxyl groups. This helps to prevent gelation or branching of the dispersant.

Preferably component ii) comprises one or more diisocyanates selected from ethylene diisocyanate, 1,6-hexamethylene diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 3,3'-dimethylbiphenyl-4,4'-diisocyanate, 2,4'-diphenylmethane diisocyanate and its hydrogenated derivative, 1,5-naphthylene diisocyanate, p-xylylene diisocyanate, m-xylylene diisocyanate, isophorone diisocyanate 4,4'-methylenebis(cyclohexyl isocyanate), methyl cyclohexane-2,4- or (2,6-) diisocyanate and 1,3-(isocyanatomethyl)cyclohexane. Of these isophorone diisocyanate is especially preferred. Preferably, at least one of the diisocyanates present in component ii) is or comprises isophorone diisocyanate.

Preferably, component ii) comprises diisocyanates which in total are at least 20 mole %, more preferably at least 30 mole % and especially at least 40 mole % relative to the total number of moles of all the monomer components used to prepare the phospho-ester functional polymer in step a). Preferably component ii) comprises diisocyanates which in total are less than 80 mole %, more preferably less than 70 mole % and more especially less than 60 mole % relative to the total number of the moles of all the monomer components used to prepare the phospho-ester functional polymer in step a).

Preferably, in the total composition used to prepare the phospho-ester functional polymer the ratio of the total number of moles of isocyanate groups to the total number of moles of hydroxyl, amino, thiol and hydrazo groups is from 0.5:1 to 1.5:1, more preferably from 0.8:1 to 1.2:1 and especially from 0.9:1 to 1.1:1.

If the phospho-ester dispersant is to be chain extended to increase the molecular weight even further it is preferred that the ratio of the total number of moles of isocyanate groups to the total number of moles of hydroxyl, amino, thiol and hydrazo groups is from 1.05:1 to 2:1, more preferably from 1.1:1 to 1.5:1. This provides isocyanate functional phospho-ester functional polymers which can be readily chain extended by for example diols, dithiols and especially diamines, hydrazine and dihydrazides.

Optional Components

In addition to components i) and ii) the monomer composition used to prepare the phospho-ester functional polymer may comprise component iii) which is one or more isocyanate reactive monomers each of which having no phospho-ester groups. The preferred isocyanate reactive groups are again hydroxyl, amino, thiol and hydrazo groups. Of these hydroxyl groups are preferred. In component iii) relatively small amounts of mono or tri- and higher functional monomers may be present in the monomer composition (e.g. mono-alcohols and triols). Preferably, the monomer composition comprises less than 5 mole %, more preferably less than 1 mole % of monomers having three or more isocyanate reactive groups relative to the total number of moles of all the monomers used to prepare the phospho-ester functional polymer in step a). More preferably component iii) comprises no monomers which have three or more isocyanate reactive groups.

When component iii) is present it preferably comprises one or more diols each having no phospho-ester groups. Preferably, the diols are not polymeric. By the word "polymeric" we mean diols having a molecular weight of 500 daltons (g per mole) or more. Examples of non-polymeric diols suitable for inclusion in component iii) include ethyleneglycol, 1,2- and 1,3-propyleneglycol, 1,2-; 1,3-; 1,4-; and 2,3-butylene glycols, 1,6-hexanediol and neopentyl glycol, 1,8-octanediol, bis-phenol A, cyclohexane diol, diethylene glycol, triethylene glycol, tetraethylene glycol, dipropylene glycol, dibutyleneglycol and the like.

Another useful class of non-polymeric diols for component iii) are the dihydroxyl alkanoic acids, of which dimethylol propionic and dimethylol butanoic acid are especially preferred.

Also useful are the dihydroxyl sulfonic acids such as bis(2-hydroxyethyl)-5-sodiosulphoisophthalate.

Of these ethylene glycol is especially preferred. Preferably, all the monomers in component iii) are diols.

Whilst component iii) may comprise polymeric diols these are preferably present at less than 10 mole %, more preferably less than 5 mole % and especially less than 1 mole % relative to the total number of moles all the monomers used to prepare the phospho-ester functional polymer in step a). More preferably no polymeric diols are present in component iii). Examples of polymeric diols include polyetherdiols (polyethylenoxide, polypropyleneoxide, polybutyleneoxide), polyesterdiols (polycaprolactone diols), acrylic diols, styrene-acrylic diols and polycarbonate diols.

When present component iii) may comprise diamines having no phospho-ester groups, suitable examples of which include ethylene diamine, 1,2- and 1,3-propane diamine, 1,4-butane diamine, 1,5-pentane diamine, 1,6-hexane diamine, isophorone diamine, cyclohexane diamine, piperaine and 4,4'-methylene bis (cyclohexyl amine).

Preferably, component iii) comprises monomers which in total are at least 5 mole %, more preferably at least 10 mole % and especially at least 20 mole % relative to the total number of moles of all the components used to prepare the phospho-ester functional polymer in step a). Preferably component iii) comprises monomers which in total are less than 70 mole %, more preferably less than 60 mole % and more especially less than 50 mole % relative to the total number of the moles of all the components used to prepare the phospho-ester functional polymer in step a).

Preferred Monomer Compositions for Step a)

In view of the above a preferred monomer composition in step a) comprises:
i) one or more monomers of the Formula (3) as mentioned above;
ii) one or more diisocyanates selected from ethylene diisocyanate, 1,6-hexamethylene diisocyanate, tetramethylxylene diisocyanate, 1,4-phenylene diisocyanate, 2,4-toluene diisocyanate, 2,6-toluene diisocyanate, 4,4'-diphenylmethane diisocyanate and its hydrogenated derivative, 3,3'-dimethylbiphenyl-4,4'-diisocyanate, 2,4'-diphenylmethane diisocyanate and its hydrogenated derivative, 1,5-naphthylene diisocyanate, p-xylylene diisocyanate, m-xylylene diisocyanate, isophorone diisocyanate 4,4'-methylenebis(cyclohexyl isocyanate), methyl cyclohexane-2,4- or (2,6-) diisocyanate and 1,3-(isocyanatomethyl)cyclohexane;

iii) one or more diols selected from ethyleneglycol, 1,2- and 1,3-propyleneglycol, 1,2-; 1,3-; 1,4-; and 2,3-butylene glycols, 1,6-hexanediol and neopentyl glycol, 1,8-octanediol, bis-phenol A, cyclohexane diol, diethylene glycol, triethylene glycol, tetraethylene glycol, dipropylene glycol, dibutyleneglycol.

As mentioned above the compound of Formula (3) is preferably of the Formula (4). As mentioned above component ii) preferably comprises isophorone diisocyanate. As mentioned above component iii) preferably comprises ethylene glycol.

Reaction Conditions for Step a)

The co-polymerisation in step a) may be performed in any suitable manner. Substantially anhydrous conditions are preferred. Temperatures of from 30° C. and 130° C. are preferred. Preferably the reaction is continued until the reaction between diisocyanate groups in component ii) and the isocyanate reactive groups such as hydroxyl, amino, thiol and hydrazo groups has completed. A catalyst may be added to speed the reaction. Suitable catalysts for polymerisation reactions are well known in the art and include tin compounds and hindered amines. The reaction time is typically from 30 minutes to 48 hours, more typically from 1 to 24 hours and most typically from 1 to 16 hours. Solvents may be added to prevent precipitation of the resulting polymer or to prevent the mixture from becoming too viscous. Preferred solvents include N-methylpyrrolidone, 2-pyrrolidone and sulfolane.

Step b) Hydrolysis

In step b) at least some (but not necessarily all) of the phospho-ester groups in the phospho-ester functional polymer are hydrolysed. The hydrolysis reaction may be performed using any suitable reagents or conditions. The hydrolysis reaction with water may be accelerated by the use of enzymes, acids, bases or metal complexes.

Preferred enzymes include esterase or lipase.

The acid may be sulfonic, sulfuric, phosphonic, phosphoric or a halo acid (especially HCl, HF, HI and most especially HBr).

The base may be an amine or an alkali metal hydroxide.

The metal complex may for example be lanthanum in the 3+ oxidation state, Cu, Ni or Zn in the 2+ oxidation state.

Of all of the above hydrolysis with halo acids, particularly HBr is preferred.

The hydrolysis reaction is preferably performed for a period of from 30 minutes to 10 hours, more preferably from 1 to 6 hours. The hydrolysis of the phospho-ester functional polymer is preferably performed in the presence of water, acetic acid and N,N-dimethyl acetamide. The temperature for the hydrolysis reaction is preferably from 30 to 100° C., more preferably from 50 to 100° C. and especially from 60 to 90° C.

The hydrolysis reaction preferably results in groups of the Formula (6a) and/or (6b);

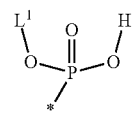

Formula (6a)

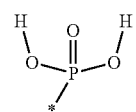

Formula (6b)

wherein $L^1$ is an optionally substituted alkyl, aryl or heterocyclyl group, the asterisk (*) marks the point of attachment to the dispersant via an oxygen or more preferably a carbon atom. $L^1$ is as previously preferred. Preferably, the attachment is to the A group as mentioned in Formula (1).

The groups of Formula (6a) and (6b) are shown in the free acid (protonated) form but they may also be in the form of a salt or a mixture of the free acid and the salt as previously mentioned.

The hydrolysis reaction is preferably such that any cleavage of the bond between the phosphorus atom and the A group in Formula (1) is minimised.

The hydrolysis reaction may be driven to completion such that the final dispersant has only phosphorus containing anionic groups of the Formula (6b).

Equally the hydrolysis may be partially complete such that the dispersant has groups of formula (6a), (6b) and some of the phospho-ester groups without any hydrolysis.

The dispersant used in the dispersing step has phosphorus containing anionic groups. These are preferably phosphonic rather than phosphoric acids and/or anionic partial esters thereof. As mentions above it is preferred that the phosphorus atom in the groups of Formulae (6a) and (6b) are attached to a carbon atom (rather than an oxygen atom) in the dispersant structure. This helps to prevent the phosphorus groups from cleaving out of the dispersant whilst the $L^1$ and $L^2$ groups are being hydrolysed.

Dispersing

The particulate solid, liquid medium and the dispersant may be dispersed by any suitable means. Low shear dispersion methods such as stirring, turning, shaking, tumbling and the like may be used. More preferably, the dispersing method is or comprises a comminution method. That is to say a dispersion method which tends to significantly reduce the particle size of the particulate solid in the liquid medium. Examples of suitable comminution methods include ultrasonication, Microfluidization™, homogenisation and especially bead milling. Combinations of these methods may be used.

Prior to comminution particulate solids and especially pigments often have a Z-average particle size of greater than 1 micron.

After the comminuition step, the particulate solid in the dispersion preferably has a Z-averaged particle size of from 50 to 300 nm, more preferably from 70 to 200 nm and especially from 80 to 150 nm. The particle size is preferably measured by a light scattering device especially a Malvern Zetasizer™. Preferably, the dispersion comprises:

i) 0.1 to 40 parts, more preferably 0.1 to 20 parts of the dispersant;

ii) 0.1 to 40 parts, more preferably 0.1 to 20 parts of the particulate solid;

iii) 50 to 99.8, more preferably 60 to 99.8 parts of the liquid medium;

wherein the sum of the parts i) to iii) is 100 parts and all parts are by weight.

Preferably, the dispersant is at least partially adsorbed onto the surface of the particulate solid.

The amount of dispersant in the dispersion is preferably from 1 to 150%, more preferably from 5 to 100%, even more preferably from 5 to 80%, especially from 5 to 70% and even more especially from 20 to 70%, and most especially from 30 to 70% by weight based on the weight of particulate solid.

These values have been found to provide the best balance of colloidal stability and final print optical density.

Preferably, the only dispersants present during the dispersing step are those obtained by a process comprising the steps a) and b).

Dispersion

It will be readily appreciated that the dispersion prepared by the present invention is preferably a liquid dispersion. Preferably, by liquid we mean liquid at a temperature of 25° C. Since the preferred liquid medium is or comprises water it follows that the preferred dispersions are aqueous.

Optional Cross-linking

In many cases it is preferred to add a step wherein the dispersant is cross-linked in the presence of the particulate solid and the liquid medium. This provides a dispersion of an encapsulated particulate solid. The encapsulated particulate solid has better colloidal stability. It is also more versatile and can be formulated into inks containing higher proportions of organic liquids and/or with strongly adsorbing surfactants. The cross-linking step is preferably performed after the dispersion step. Whilst not wishing to be limited by any particular theory it is believed that the cross-linking step locks the dispersants in place on the surface of particulate solid and inhibits or prevents normal dispersant desorption. In some embodiments the dispersant forms a cross-linked shell which encapsulates the particulate solid core. It is preferred that the dispersant is not bonded to the surface of the particulate solid.

The cross-linking reaction may be by ionic cross-linking but more preferably the cross-linking forms covalent bonds. These covalent bonds preferably bind the dispersant molecules together so forming a cross-linked dispersant shell around each particle of the solid. This results in the dispersant molecules being permanently associated with each particulate solid particle.

The cross-linking can be achieved by using a self cross-linking dispersant. More preferably, a cross-linking agent is used to cross-link the dispersant. Examples of suitable combinations of cross-linkable groups in the dispersant and cross-linking groups in the cross-linking agent are listed in PCT patent publication WO 2005/061087 at page 6, Table 1. Of these it is preferred that the cross-linkable group in the polymer is an anionic group especially a phosphorus containing anionic group or a carboxylic acid group, more preferably a phosphorus containing anionic group. The anionic groups may be in the free acid or salt form. For these cross-linkable groups the cross-linking agent is preferably selected from melamines, carbodiimides, oxetanes, isocyanates, aziridines and especially epoxides. Preferably, cross-linking is effected by means of an epoxy cross-linking agent.

The dispersant may optionally have hydroxyl (HO—) groups which may be in chain and/or terminal groups. These hydroxyl groups may be cross-linked using the abovementioned cross-linking agents.

Preferably, at least some, more preferably all of the cross-linking reaction takes place between phosphorus containing anionic groups (especially phosphonic acid groups) and epoxy groups.

The cross-linking reaction is preferably performed at a pH of from 7 to 12, more preferably from 8 to 12.

The cross-linking reaction is preferably performed at a temperature of from 30 to 150° C., more preferably from 40 to 100° C. The time for the cross-linking reaction is preferably from 30 minutes to 24 hours.

Optional Purification

Especially when the dispersion is to be used to prepare an ink jet printing ink it is desirable to purify the dispersion. A preferred method for purification is membrane filtration especially ultrafiltration. Preferably, the membrane filtration is performed in cross-flow mode.

Inks

When the particulate solid is a colorant (especially a pigment), the process according to the first aspect of the present invention is particularly suitable for preparing dispersions which are inks.

Preferably, to prepare an ink the process according to the first aspect of the present invention further comprises the step of adding one or more ink additives selected from viscosity modifiers, pH buffers, corrosion inhibitors, biocides, dyes, further pigments, kogation reducing additives, chelating agents, surfactants, water-miscible organic liquids and binders.

Preferred viscosity modifiers include polyethylene glycol polymers.

Preferred surfactants include the acetylenic diols especially those sold under the Surfynol™ tradename.

Preferably, the ink is a liquid at 25° C.

Preferably, the ink has a viscosity of less than 30 mPa·s, more preferably less than 20 mPa·s and especially less than 10 mPa·s. The viscosity is preferably at least 2 mPa·s. Preferably, the viscosity is Newtonian. Preferably, the viscosity is measured at 25° C. Preferably, the viscosity is measured using a shear rate of 100 s$^{-1}$. The viscosity is preferably measured using a cone and plate geometry. A preferred apparatus for measuring the viscosity is a TA Instruments rheometer. This ink viscosity may be achieved by the use of low viscosity liquid vehicles (e.g. water), the use of particulate solids at below 10 wt % based on the ink and the avoidance of any thickeners (e.g. cellulose, polyvinyl alcohol, polyvinyl pyrrolidone, polyacrylamide).

Preferably, the ink has a surface tension of 20 to 65 dynes/cm, more preferably 30 to 60 dynes/cm, when measured at a temperature of 25° C. The surface tension is preferably measured using a Kibron AquaPi. Suitable surface tensions can be achieved by the present of a surfactant in the ink. Preferably the surfactant is present in the ink at from 0.01 to 5 wt %, more preferably from 0.05 to 4 wt % and especially from 0.5 to 3 wt % based on the ink. The acetylenic surfactants (including the acetylenic diols and ethoxylated diols) are especially suitable as surfactants. Suitable examples include those sold under the Surfynol™ tradename available from Air Products.

The pH of the ink is preferably from 4 to 11, more preferably from 7 to 10.

The ink has preferably been treated so as to remove particles having a particle size of greater than 1 micron. This may be done by centrifugation and/or filtration.

Preferably, the only dispersant in the ink is that obtained by a process comprising at least the steps a) and b)).

Preferably, the only pigments present in the ink are those prepared from dispersions obtained according to the first aspect of the present invention.

Liquid Vehicle

The liquid components of the ink are referred to herein as the liquid vehicle. These may be the same as those mentioned before for the liquid medium, however the ink often comprises more complex mixtures of liquids.

Preferably, the liquid vehicle is or comprises water. Accordingly, preferred inks are aqueous.

In order of increasing preference the amount of water is preferably 1%, 2%, 5%, 10%, 20%, 35%, 50%, 60% and 70% by weight relative to all the components present in the liquid vehicle. The remainder required to meet 100% by weight is preferably one or more water-miscible organic liquids as hereinbefore mentioned and preferred in regard to the liquid medium. The water-miscible organic liquids for the ink are preferably selected from glycerol, 2-pyrrolidone, ethylene glycol and 1,2 hexane diol.

Preferably, the liquid vehicle comprises water and one or more organic liquids, especially water-miscible organic liquids. It is preferred that the liquid vehicle comprises water and more than 1% by weight, more preferably more than 5% by weight, especially more than 10% by weight and most especially more than 20% weight of one or more water-miscible organic liquids relative to the total amount of the liquid vehicle. Preferably, the water-miscible organic liquids are present in no more than 90%, more preferably no more than 70%, especially no more than 50% by weight relative to all the components of the liquid vehicle.

In one case none of the components of the liquid vehicle are photo polymerisable.

Preferably, the ink comprises:
i) 0.1 to 10 parts, more preferably from 1 to 10 parts of the dispersant;
ii) 0.1 to 10 parts, more preferably from 1 to 10 parts of a pigment;
iii) 80 to 99.8 parts, more preferably 80 to 98 parts of a liquid vehicle wherein all parts are by weight.

When the inks are used for ink jet printing it is preferred to prepare a cyan, magenta, yellow and black ink using pigments of the appropriate colour. The pigment in the cyan ink is preferably Copper phthalocyanine. The pigment in the magenta ink is preferably C.I. Pigment Red 122. The pigment in the yellow ink is preferably C.I. Pigment Yellow 74. These preferably constitute an ink set.

Dispersions Obtained or Obtainable

According to a second aspect of the present invention there is provided a dispersion obtained or obtainable by a process according to the first aspect of the present invention.

Ink Jet Printing Ink

According to a third aspect of the present invention there is provided an ink jet printing ink comprising a dispersion according to the second aspect of the present invention.

The ink jet printing inks may be printed by any suitable ink jet printers including those which use thermal, piezo or acoustic droplet ejection mechanisms. The ink jet printing mechanism may be scanning mode or single pass.

Container+Ink

According to a fourth aspect of the present invention there is provided a container containing an ink jet printing ink according to the third aspect of the present invention. The container may be an ink jet printer cartridge. The container may be a drum, bottle, tub, tank or any form suitable for the storage of the ink. In some instances the container may be suitably adapted such that it may be readily connected to an ink jet printer.

Use

According to a fifth aspect of the present invention there is provided the use of a dispersant for preparing an ink jet printing ink comprising the liquid vehicle, the dispersant and the particulate solid;

wherein the dispersant is obtained by a process comprising at least the steps a) and b) as previously defined in the first aspect of the present invention.

The dispersant, the liquid vehicle and the particulate solid are as previously mentioned and preferred.

EXAMPLES

1. Preparation of Dispersant (1)

1.1. Preparation of 2-(1,3-oxazolidin-3-yl)ethanol

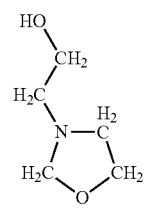

Paraformaldehyde (2.5 mol, 75 g) was added in portions to diethanolamine (2.5 mol, 262.5 g) at a temperature of 50 to 60° C. to form a reaction mixture. On completion of the addition, the reaction mixture was stirred at 50 to 60° C. for 30 minutes resulting in a clear solution. Toluene (300 ml) was added to the reaction mixture which was subsequently stirred at reflux for 3 hours. During this time, the water produced within the reaction mixture was removed with a Dean and Stark separator. On completion of the reaction the toluene was removed under reduced pressure to give 2-(1, 3-oxazolidin-3-yl)ethanol as a pale yellow liquid.

1.2. Diethyl[bis(2-hydroxyethyl)amino]methylphosphonate

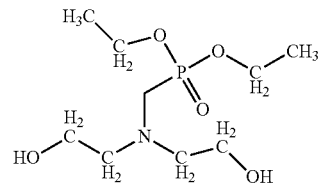 [SMILES: CCOP(=O)(CN(CCO)CCO)OCC]

Diethyl phosphite (2.5 mol, 352/3 g) was added slowly to a mixture of the product from stage (1.1) and Amberlight™ IR120 resin—acid form (available from Aldrich, 100 g) to form a reaction mixture. On completion of the addition, the reaction mixture was stirred at 60° C. for 2 hours and then allowed to cool to a temperature of 25° C. The product was extracted with a 2:1 mixture of diethyl ether and ethyl acetate (5×300 ml), the combined extracts were dried over magnesium sulphate and evaporated to give 354 g of diethyl [bis(2-hydroxyethyl)amino]methylphosphonate in the form of a pale yellow liquid. The product was stored over 4A molecular sieves. This was designated Monomer (1).

1.3. Preparation of a Phospho-Ester Functional Polymer (Co-polymerisation—step a)

A mixture of Monomer (1) prepared above in step 1.2 (0.300 mol, 38.29 g), ethylene glycol (0.951 mol, 29.5 g), isophorone diisocyanate (1.190 mol, 132.21 g) and N-methylpyrrolidone (200 g) were stirred and heated to 50° C. and 2 drops of tin ethylhexanoate catalyst were added. This formed a reaction mixture. The reaction mixture was stirred at a temperature of from 95 to 100° C. for 18 hours and then allowed to cool to 25° C. The reaction mixture was added to water (4000 ml) and stirred to give a white precipitate. The resultant solid was collected by filtration, washed with water (500 ml) and dried. The resulting polyurethane dispersant had a number average molecular weight of 14,647 and a weight average molecular weight of 22,555 as determined by GPC and was used in the next stage without further purification. This was designated Phospho-ester functional Polymer (1).

1.4. Hydrolysis (Step b)

Phospho-ester functional Polymer (1) prepared in step 1.3 was dissolved in a mixture of acetic acid (500 ml) and N,N-dimethylacetamide (500 ml) and warmed to 60° C. to form a reaction mixture. 48% aqueous hydrobromic acid solution (300 g) was added slowly to the reaction mixture which was subsequently stirred at a temperature of from 75 to 80° C. for 3 hours and then allowed to cool to 25° C. The reaction mixture was added to water (4000 ml) to give a solution and then acidified by the addition of concentrated hydrochloric acid until the pH was reduced to 0.5. The resultant precipitate was collected by filtration and then suspended in water (2000 ml). The pH of the suspension was adjusted to 11 by the addition of lithium hydroxide and then the suspension was stirred for 1 hour. Following acidification as described above the precipitate was collected, suspended in water (500 ml) at pH=11 (LiOH) and dialysed to a conductivity of less than 100 microS/cm. The dialysed solution was evaporated in an oven at 60° C. to give 151 g of a cream solid. This was designated Dispersant (1).

Phosphorus analysis of the product using ICP-OES indicated a content of 1.8% wt/wt. This equated to an acid value of 1.2 mmol/g or a phosphonic acid group content of 0.6 mmol/g.

1.5 Preparation of Dispersant (2)

Dispersant (2) was prepared as described for Dispersant (1) but using dipropylene glycol (0.951 mol) instead of ethylene glycol in step 1.3.

1.6 Preparation of Dispersant (3)

Dispersant (3) was prepared as described for Dispersant (1) but using polypropylene glycol average Mn=425 (0.951 mol) instead of ethylene glycol and 4,4'-methylenebis(phenyl isocyanate) (1.190 mol) instead of isophorone diisocyanate in step 1.3.

2. Preparation of Dispersant Solution (1)

Dispersant (1) as prepared in step 1.4 (100 g), potassium hydroxide solution (45% w/w) (20.6 g) and de-ionised water (607.8 g) were heated in a reactor at 70° C. for 1 hour. The dispersant was stirred and allowed to fully dissolve. Further potassium hydroxide solution (45% w/w) was added drop wise until a pH of about 9 was reached. This was designated as Dispersant Solution (1). The solution contained approximately 15% by weight of Dispersant (1).

3. Preparation of Mill-base (1)

Pigment powder (75 g of NIPex™ 1701Q Carbon Black pigment, ex Evonik Degussa), Dispersant Solution (1) as prepared in step 2. (100 g) along with water (383.75 g) and diproylene glycol (156.25 g) were mixed together by hand using a spatula to form a pre-mixture.

The pre-mixture was transferred to a vertical bead mill containing 0.8-1 mm beads. The mixture was then comminuted (milled) for 4.5 hours.

The milling beads were then separated from the milled mixture. This resulted in Mill-base (1). Mill-base (1) contained approximately 12% by weight of pigment. The pigment particles in the resulting mill-base had a Z-Average particle size of 128 nm. The Z-Average particle size was established by using a Zetasizer™ ZS90 obtained from Malvern.

4. Cross-linking of the Dispersant

Mill-base (1) prepared above in point 3 was adjusted to a solids content of about 8% by weight by the addition of water (180 g).

The dispersant in the mill-base was then cross-linked using 0.09 g of the cross-linking agent, polyethylene glycol diglycidyl ether (Denacol EX-521 obtained from Nagase ChemteX, with weight per epoxy=214.5, hereafter abbreviated as EX-521). This cross-linked the carboxylic acid groups in the dispersant and thereby encapsulated the pigment particles. The cross-linking reaction was controlled by the presence of 0.026 g boric acid (obtained from Aldrich). The cross-linking reaction was effected by heating the above described mixture to a temperature of about 65° C. for 5 hours. This prepared Encapsulated pigment dispersion (1).

5 Membrane filtration

The Encapsulated pigment dispersion prepared above in point 4 was purified by using membrane having a 0.1 micron pore size. Encapsulated pigment dispersions (1) was diafiltered with approximately 10 to 40 wash volumes of pure deionized water per 1 volume of the Encapsulated pigment dispersion (1). The membrane was then used to concentrate Encapsulated pigment dispersion (1) back to a pigment content of around 10.9% by weight. This resulted in Purified Dispersion (1).

6. Preparation of Ink (1)

Purified Dispersion (1) as prepared in step 5. was used to prepare Ink (1) which had the following composition:
Ink Vehicle

| | |
|---|---|
| Purified Dispersion (1) | 55.05 g |
| 2-Pyrrolidone | 3.00 g |
| Glycerol | 15.00 g |
| 1,2 Hexane diol | 4.00 g |
| Ethylene glycol | 5.00 g |
| Surfynol ™ 465 | 0.50 g |
| Pure water | 17.45 g |

Surfynol® 465 is a surfactant available from Airproducts.

The preparation of Inks (2) and (3) was performed following the above steps 2 to 5 except using Dispersants (2) and (3) in place of Dispersant (1) and using Denacol EX321 in place of Denacol EX521 in step 4. Denacol EX321 is trimethylolpropane polyglycidyl ether as sold from Nagase ChemteX and was used at a loading of 7.6 wt % based on the amount of dispersant used in the ink preparation.

7. Preparation of Prints

Inks (1) to (3) as prepared in step 6. were printed onto plain (untreated) paper, namely Canon GF500 paper. Printing was performed by means of an Epson SX100 series ink jet printer printing 100% blocks of black.

8. Measurement of Optical Density

The reflectance optical density (ROD) was measured using a Gretag Macbeth key wizard V2.5 Spectrolino photodensitometer instrument, illuminated using a D65 light source at an observer angle of 2° and with no filter fitted. Measurements were taken at least two points along the print and were then averaged.

9. Results of Optical Density Measurements

The results of the ROD measurements were as summarised below in Table 1.

TABLE 1

| Prints obtained from Inks (1) to (3) | | |
|---|---|---|
| Ink | Dispersant | ROD |
| Black Ink (1) | Dispersant (1) | 1.32 |
| Black Ink (2) | Dispersant (2) | 1.33 |
| Black Ink (3) | Dispersant (3) | 1.29 |

From Table 1, it can readily be seen that the dispersion prepared by the process according to the first aspect of the present invention provides an ink which has exceptionally good optical density. To provide a comparison it can be seen from the results in PCT publication WO2011/104526 at pages 43 and 44, Table 3 that it is exceptionally difficult to prepare polyurethane dispersed carbon black inks with an OD above about 1.30.

10. Further Examples

Additional examples of dispersants were prepared following the steps 1.1 to 1.4 described above. Table 2 shows the diisocyanate and diol used in step 1.3. Dispersants (4) to (9) were converted to the corresponding mill bases by mixing with carbon black pigment and water and comminuted using a Branson ultrasonic mill. Formulation of the mill bases into inks and printing as described above also gave high optical density.

TABLE 2

| Dispersant | Diisocyanate | Diol |
|---|---|---|
| Dispersant (4) | 4,4'-methylenebis(cyclohexyl isocyanate) | Ethylene glycol |
| Dispersant (5) | 4,4'-methylenebis(cyclohexyl isocyanate) | dipropylene glycol |
| Dispersant (6) | 4,4'-methylenebis(phenyl isocyanate) | dipropylene glycol |
| Dispersant (7) | isophorone diisocyanate | Poly(1,4-butanediol) average Mn = 250 |
| Dispersant (8) | isophorone diisocyanate | polypropylene glycol average Mn = 425 |
| Dispersant (9) | isophorone diisocyanate | Polyethylene glycol average Mn = 400 |

11. Further Inks

The further inks described in Tables I and II may be prepared wherein PD is an abbreviation of Purified Dispersion is as prepared above in step 5 and the ink additives are as defined below. Numbers quoted in the second column onwards refer to the number of parts of the relevant ingredient and all parts are by weight. The inks may be applied to paper by thermal, piezo or Memjet ink jet printing.

The following abbreviations are used in Table I and II:
PG=propylene glycol
DEG=diethylene glycol
NMP=N-methylpyrrolidone
DMK=dimethylketone
IPA=isopropanol
MeOH=methanol
2P=2-pyrrolidone
MIBK=methylisobutyl ketone
P12=propane-1,2-diol
BDL=butane-2,3-diol
Surf=Surfynol™ 465 from Airproducts
PHO=$Na_2HPO_4$ and
TBT=tertiary butanol
TDG=thiodiglycol
GLY=Glycerol
nBDPG=mono-n-butyl ether of dipropylene glycol
nBDEG=mono-n-butyl ether of diethylene glycol
nBTEG=mono-n-butyl ether of triethylene glycol

TABLE I

| PD | PD amount | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| 1 | 30 | 50 | 5 | | 6 | 3 | | | | | 5 | | 1 | |
| 1 | 30 | 59.8 | | 5 | 5 | | 0.2 | | | | | | | |
| 1 | 40 | 45 | 3 | | 3 | 3 | | | 5 | 1 | | | | |
| 1 | 40 | 51 | | 8 | | | | | | | | 1 | | |
| 1 | 40 | 45.8 | 5 | | | | 0.2 | 4 | | | | 5 | | |
| 1 | 40 | 41 | | | 9 | | 0.5 | 0.5 | | | 9 | | | |
| 1 | 40 | 10 | 4 | 15 | 3 | 3 | | | 6 | 10 | 5 | 4 | | |
| 1 | 40 | 30 | | 20 | | | | | 9 | | | | | 1 |
| 1 | 50 | 25 | 5 | 4 | | 5 | | | | 6 | | 5 | | |
| 1 | 50 | 29.7 | 3 | 5 | 2 | 10 | 0.3 | | | | | | | |
| 1 | 50 | 15 | | 5 | 4 | 6 | | | 5 | 4 | 6 | 5 | | |
| 1 | 50 | 46 | | | | | | | | | 4 | | | |

TABLE I-continued

| PD | PD amount | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| 1 | 40 | 50 | 5 | | | | | | 5 | | | | | |
| 1 | 40 | 40 | 2 | 6 | 2 | 5 | | | 1 | | | 4 | | |
| 1 | 40 | 40 | | | 5 | | | | | | | 15 | | |
| 1 | 40 | 44 | | | 11 | | | | | | | 5 | | |
| 1 | 50 | 30 | 2 | | | 10 | | | | | 2 | 6 | | |
| 1 | 50 | 39.7 | | | | 7 | 0.3 | | 3 | | | | | |
| 1 | 40 | 29 | 2 | 20 | 2 | 1 | | | | | | 3 | 3 | |
| 1 | 40 | 51 | | | 4 | | | | | | | 5 | | |
| 1 | 40 | 40 | | | | | | | | | | | 20 | |
| 1 | 40 | 40 | | | | | | | | | | | | 20 |

TABLE II

| PD | PD amount | Water | PG | DEG | NMP | Surf | TBT | TDG | BDL | PHO | 2P | Pl2 | nBDEG | nBTEG |
|---|---|---|---|---|---|---|---|---|---|---|---|---|---|---|
| 1 | 30 | 49.8 | 15 | | | 0.2 | | | | | 5 | | | |
| 1 | 30 | 58.8 | | 5 | | | | | | 1.2 | 5 | | | |
| 1 | 40 | 44.56 | 5 | 5 | | 0.1 | 4 | 0.2 | | | | | | 1 |
| 1 | 40 | 49.88 | | 6 | 4 | 5 | | | | 0.12 | | | | |
| 1 | 40 | 41.7 | 4 | 8 | | | | | | | 6 | | | |
| 1 | 40 | 44.8 | | 10 | | 0.3 | | | 5 | 0.2 | | | | |
| 1 | 50 | 39.7 | | 5 | 5 | | | 0.3 | | | | | | |
| 1 | 50 | 20 | | 10 | 4 | | | | 1 | | 4 | 11 | | |
| 1 | 40 | 35 | 4 | 10 | 3 | | | | 2 | | 6 | | | |
| 1 | 40 | 51 | | | 6 | | | | | | 3 | | | |
| 1 | 40 | 35.05 | | 9 | 7 | | 2 | | | 0.95 | 5 | | 1 | |
| 1 | 40 | 38 | 5 | 11 | | | | | | | 6 | | | |
| 1 | 50 | 36 | | | 7 | | | | | | 7 | | | |
| 1 | 50 | 24.5 | 5 | 5 | 4.1 | | 0.2 | 0.1 | 5 | 0.1 | 5 | | | |
| 1 | 40 | 50 | | 10 | | 1 | | | | | | | | |
| 1 | 40 | 50 | | | | | | 10 | | | | | | |
| 1 | 30 | 48 | | | 5 | | | 12 | | | 5 | | | |
| 1 | 30 | 40 | 2 | | 8 | | | 15 | | | 5 | | | |
| 1 | 40 | 40 | | | | | | 8 | | 12 | | | | |
| 1 | 40 | 40 | | 10 | | | | | | | | | 1 | |
| 1 | 40 | 40 | | | | | | | | 10 | | 0 | | 10 |

The invention claimed is:

1. A process for the preparation of a dispersion, comprising:
dispersing a composition comprising a particulate solid, a liquid medium and a dispersant;
wherein the dispersant is obtained by a process comprising at least the steps a) and b):
a) co-polymerising a monomer composition comprising at least the components i) and ii) so as to form a phospho-ester functional polymer:
  i) a monomer having at least one phospho-ester group and two groups independently selected from hydroxyl, amino, thiol and hydrazo groups;
  ii) a diisocyanate; and
b) hydrolysing at least some of the phospho-ester groups in the phospho-ester functional polymer so as to result in a dispersant having phosphorus containing anionic groups.

2. The process according to claim 1 wherein component i) comprises a monomer of the Formula (1):

X$^1$-A-X$^2$   Formula (1)

wherein:
X$^1$ and X$^2$ are each independently selected from amine, hydrazo, thiol and hydroxyl groups;
A is an organic group substituted with one or more groups of the Formula (2):

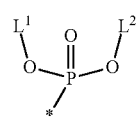

Formula (2)

wherein:
each L$^1$ and L$^2$ independently is H or an optionally substituted alkyl, aryl or heterocyclyl group and wherein the optional substituents are selected from the group consisting of —NO$_2$, CN, halo, —NHC(O)C$_{1-6}$alkyl, —SO$_2$NHC$_{1-6}$alkyl, —SO$_2$C$_{1-6}$alkyl, —OC$_{1-6}$alkyl and —OC(O)C$_{1-6}$alkyl, provided that L$^1$ and L$^2$ are not both H;
the asterisk (*) represents the point of attachment of the group of Formula (2) in the compound of Formula (1); and
the phosphorus atom in Formula (2) is bonded to the A group in Formula (1) via a carbon or oxygen atom in the A group.

3. The process according to claim 2 wherein L$^1$ and L$^2$ are each independently selected from unsubstituted C$_{1-4}$ alkyl groups and X$^1$ and X$^2$ are hydroxyl.

4. The process according to claim 1 wherein component i) comprises a monomer of the Formula (3):

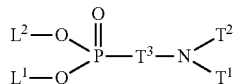

Formula (3)

wherein:
each $L^1$ and $L^2$ independently is H or an optionally substituted alkyl, aryl or heterocyclyl group and wherein the optional substituents are selected from the group consisting of —$NO_2$, CN, halo, —NHC(O)$C_{1-6}$alkyl, —$SO_2NHC_{1-6}$alkyl, —$SO_2C_{1-6}$alkyl, —$OC_{1-6}$alkyl and —OC(O)$C_{1-6}$alkyl, provided that $L^1$ and $L^2$ are not both H;

$T^1$ and $T^2$ each independently are $C_{1-6}$ alkyl each having a single hydroxyl group; and $T^3$ is a $C_{1-6}$ alkylene group.

5. The process according to claim 1 wherein component ii) comprises one or more diisocyanates selected from ethylene diisocyanate, 1,6-hexamethylene diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 3,3'-dimethylbiphenyl-4,4'-diisocyanate, 2,4'-diphenylmethane diisocyanate and its hydrogenated derivative, 1,5-naphthylene diisocyanate, p-xylylene diisocyanate, m-xylylene diisocyanate, isophorone diisocyanate 4,4'-methylenebis(cyclohexyl isocyanate), methyl cyclohexane-2,4- or (2,6-) diisocyanate and 1,3-(isocyanatomethyl) cyclohexane.

6. The process according to claim 1 wherein the monomer composition in step a) additionally comprises component iii):
iii) one or more diols selected from ethyleneglycol, 1,2- and 1,3-propyleneglycol, 1,2-; 1,3-; 1,4-; and 2,3-butylene glycols, 1,6-hexanediol and neopentyl glycol, 1,8-octanediol, bis-phenol A, cyclohexane diol, diethylene glycol, triethylene glycol, tetraethylene glycol, dipropylene glycol and dibutyleneglycol.

7. The process according to claim 1 wherein the dispersant has from 0.05 to 5 mmoles/g of phosphorus containing anionic groups per g of dispersant.

8. The process according to claim 1 wherein the dispersant has a weight averaged molecular weight of from 1,000 to 500,000.

9. The process according to claim 1 wherein the liquid medium comprises water.

10. The process according to claim 1 wherein the dispersant is cross-linked in the presence of the particulate solid and the liquid medium so as to provide a dispersion of an encapsulated particulate solid.

11. The process according to claim 1 wherein the particulate solid is a pigment and the dispersion is an ink.

12. The process according to claim 11 for preparing a dispersion which is an ink having a viscosity of less than 30 mPa·s at a temperature of 25° C.

13. A dispersion obtained by the process according to claim 1.

14. An ink jet printing ink comprising a dispersion according to claim 13.

15. The process according to claim 1 wherein:
(a) component i) comprises a monomer of the Formula (1):

$$X^1\text{-A-}X^2 \quad \text{Formula (1)}$$

wherein:
$X^1$ and $X^2$ are each independently selected from amine, hydrazo, thiol and hydroxyl groups;
A is an organic group substituted with one or more groups of the Formula (2):

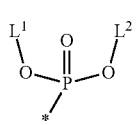

Formula (2)

wherein:
each $L^1$ and $L^2$ independently is H or an optionally substituted alkyl, aryl or heterocyclyl group and wherein the optional substituents are selected from the group consisting of —$NO_2$, CN, halo, —NHC(O)$C_{1-6}$alkyl, —$SO_2NHC_{1-6}$alkyl, —$SO_2C_{1-6}$alkyl, —$OC_{1-6}$alkyl and —OC(O)$C_{1-6}$alkyl, provided that $L^1$ and $L^2$ are not both H;
the asterisk (*) represents the point of attachment of the group of Formula (2) in the compound of Formula (1); and
the phosphorus atom in Formula (2) is bonded to the A group in Formula (1) via a carbon or oxygen atom in the A group;

(b) component ii) comprises one or more diisocyanates selected from ethylene diisocyanate, 1,6-hexamethylene diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 3,3'-dimethylbiphenyl-4,4'-diisocyanate, 2,4'-diphenylmethane diisocyanate and its hydrogenated derivative, 1,5-naphthylene diisocyanate, p-xylylene diisocyanate, m-xylylene diisocyanate, isophorone diisocyanate 4,4'-methylenebis(cyclohexyl isocyanate), methyl cyclohexane-2,4- or (2,6-) diisocyanate and 1,3-(isocyanatomethyl) cyclohexane; and (c) the monomer composition in step a) optionally further comprises component iii):
iii) one or more diols selected from ethyleneglycol, 1,2- and 1,3-propyleneglycol, 1,2-; 1,3-; 1,4-; and 2,3-butylene glycols, 1,6- hexanediol and neopentyl glycol, 1,8-octanediol, bis-phenol A, cyclohexane diol, diethylene glycol, triethylene glycol, tetraethylene glycol, dipropylene glycol and dibutyleneglycol.

16. The process according to claim 15 wherein the dispersant has (a) from 0.05 to 5 mmoles/g of phosphorus containing anionic groups per g of dispersant and (b) a weight averaged molecular weight of from 1,000 to 500,000.

17. The process according to claim 15 wherein the dispersant is cross-linked in the presence of the particulate solid and the liquid medium so as to provide a dispersion of an encapsulated particulate solid.

18. The process according to claim 17 wherein the particulate solid is a pigment and the dispersion is an ink.

19. A dispersion obtained by the process according to claim 15.

20. An ink jet printing ink comprising a dispersion according to claim 19.

* * * * *